United States Patent
Yasaki et al.

(10) Patent No.: US 7,454,768 B2
(45) Date of Patent: Nov. 18, 2008

(54) DISK CARRYING MECHANISM AND DISK PLAYER

(75) Inventors: Akira Yasaki, Kawagoe (JP); Shigeru Kojima, Kawagoe (JP); Norio Matsuda, Kawagoe (JP); Hideki Kinoshita, Kawagoe (JP); Hitoshi Yamazaki, Kawagoe (JP); Jun Togashi, Kawagoe (JP); Yasuhiro Shinkai, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 251 days.

(21) Appl. No.: 10/593,559

(22) PCT Filed: Mar. 29, 2005

(86) PCT No.: PCT/JP2005/005801

§ 371 (c)(1),
(2), (4) Date: Sep. 20, 2006

(87) PCT Pub. No.: WO2005/096293

PCT Pub. Date: Oct. 13, 2005

(65) Prior Publication Data

US 2007/0199007 A1 Aug. 23, 2007

(30) Foreign Application Priority Data

Mar. 30, 2004 (JP) ............................. 2004-100374

(51) Int. Cl.
*G11B 17/04* (2006.01)

(52) U.S. Cl. .................................................. 720/624

(58) Field of Classification Search .............. 720/623, 720/624, 625, 626; 360/99.02, 99.03, 99.06, 360/99.07; 369/77.1, 13.17
See application file for complete search history.

(56) References Cited

U.S. PATENT DOCUMENTS

| 5,036,509 A * | 7/1991 | Kobayashi et al. .......... 720/623 |
| 6,469,972 B1 * | 10/2002 | Morimoto et al. ........... 720/616 |
| 6,779,190 B2 * | 8/2004 | Akatani et al. .............. 720/624 |
| 6,891,780 B1 * | 5/2005 | Kage et al. ................ 369/13.17 |
| 7,308,692 B2 * | 12/2007 | Kasama et al. .............. 720/625 |
| 2002/0041560 A1 * | 4/2002 | Fujiwara et al. ............ 369/77.1 |
| 2003/0043721 A1 * | 3/2003 | Akatani et al. ............. 369/77.1 |
| 2007/0240175 A1 * | 10/2007 | Yoshida et al. .............. 720/625 |

FOREIGN PATENT DOCUMENTS

| JP | 2002-329359 | 11/2002 |
| JP | 2003-77198 | 3/2003 |
| JP | 2005-116029 | 4/2005 |

* cited by examiner

*Primary Examiner*—Tianjie Chen
(74) *Attorney, Agent, or Firm*—Kratz, Quintos & Hanson, LLP

(57) ABSTRACT

Provided is a disk carrying mechanism, in which a guide member (32) is installed on a disk guide block (41) and the disk guide block (41) with the guide member (32) being disposed on an opposite side of a roller (31) with a carrying route therebetween. The guide member (32) is formed as a ridge extending in a direction orthogonal to a direction of a carrying route and inclined from a center part to a peripheral edge part of a disk so that its height can be increased.

8 Claims, 8 Drawing Sheets

DISK CARRYING MECHANISM AND DISK PLAYER

TECHNICAL FIELD

The present invention relates to a disk carrying mechanism and a disk player.

BACKGROUND ART

A disk type recording medium, such as a compact disc (CD) or a digital versatile disk (DVD), has been widely used as a portable information recording medium for a computer system, an audio/video recording/reproducing apparatus (disk player), and the like.

While some of such disk type recording mediums are loaded into a recording/reproducing apparatus while accommodated in a case or a kind of case called a caddy, etc., most disk type recording mediums used are loaded, with the disk main bodies thereof being exposed.

As a recording/reproducing apparatus (disk player) into which a disk is loaded in an exposed state, there are often used a so-called tray type apparatus and a so-called slot-in type apparatus.

The tray type apparatus is provided with a tray that can be moved by a carrying motor or the like so as to advance toward and retreat from a disk player for performing recording and reproduction on and from a disk. When loading the disk, the tray is caused to advance from the disk player, and the disk is placed on this tray. In this state, the tray is caused to retreat into the disk player. Through this operation, the disk is carried to a predetermined position in the disk player together with the tray, and clamped onto a hub or the like of a rotation mechanism to perform recording or reproduction on or from the disk.

In the slot-in type apparatus, there is used, in order to directly carry a disk without using any tray, a carrying mechanism composed of a slot allowing passage of the disk, a roller adapted to come into contact with the disk inserted into the slot, a carrying motor for rotating this roller, etc. When loading a disk into the apparatus, the peripheral edge of the disk is inserted into the slot. Then, the roller comes into contact with the back surface of the disk, and the roller is rotated by the carrying motor, whereby the disk is carried to a predetermined position.

Those two types of apparatuses only differ from each other in the carrying mechanism using a tray, a roller, etc. Regarding the rotation drive mechanism consisting of a hub of a rotation mechanism, a drive motor, etc. and a recording/reproduction mechanism which includes a pick-up or the like for recording and reproduction of information on and from a disk rotated by the rotation drive mechanism, substantially the same mechanisms are used in these two types of apparatuses.

In the above-described slot-in type disk player, it is necessary to reliably perform the following series of operations: to take in the disk through the slot by driving the roller by the carrying motor when a part of the disk is inserted through the slot; and to continuously move the disk along the carrying route to send the disk to a predetermined position in the disk player.

In general, the roller of the carrying mechanism of a conventional slot-in type disk player is formed as a bar arranged to extend along the slot, and is brought into contact with the back surface (i.e., recording surface) of the disk inserted into the slot.

The surface of the roller is entirely covered with a rubber-based material having high contact resistance, and the roller has a tapered configuration which is narrow at the center and is gradually increased in thickness toward both ends. Due to this construction, the roller comes into contact solely with small regions in the peripheral edge of the disk, and can reliably move the disk held in contact therewith through rolling. Due to this construction of the roller, the roller comes into contact with the recording surface side of the disk. However, the roller does not come into direct contact with the recording surface, thus minimizing the influence on the recording surface.

In the conventional slot-in type disk player, there is formed, on the side opposite to the roller of the carrying mechanism, a guide member for maintaining the disk in the carrying route.

To be more specific, a protruding portion swollen toward the disk carrying route is provided on a front panel member including a frame of the disk player or a slot opening, and this protruding portion comes into contact with the disk, which is pressed by the roller, from the opposite side to support the disk. Due to this contact, the carrying of the disk by the roller is reliably effected.

In order to conform to the frontage width corresponding to the insertion depth of the disk or to a difference in the disk size, the guide member is formed not as a simple protruding portion but as a rib construction extending in the same direction as the guide rail (i.e., a direction crossing the disk carrying direction).

In order to avoid an adverse influence on the disk surface (i.e., labeled surface) like wear, such a rib-like guide member is formed, if possible, so as to come into contact solely with the peripheral edge portion of the disk.

In view of this, the rib-like guide member is formed with a predetermined inclination such that it exhibits a large height (in other words, large protruding amount) at both ends of the slot and exhibits a small height in the middle portion of the slot, thus gradually increasing in height toward both ends (see, for example, Patent Document 1 and Patent Document 2).

In the conventional slot-in type disk player, it is necessary to start the carrying mechanism when a part of the disk is inserted into the slot. For this purpose, there is provided, in the disk player, a contact type detection mechanism on the inner side of the slot. In the case of CDs or the like, some of them have a diameter of approximately 12 cm, and the others 8 cm. This difference in size is also detected by the detection mechanism.

The detection mechanism has, for example, a guide rail installed so as to extend along the inner side of the slot, a moving member installed so as to be movable along this guide rail, a contact member in the form of a protrusion or the like formed on this moving member and adapted to come into contact with the peripheral edge of a disk, and a plurality of switches installed at predetermined positions along the guide rail and adapted to detect passage of the moving member.

Usually, the moving member with the contact member and the guide rail are arranged in a pair on both sides of the slot. Due to this arrangement in a pair, even if the center of the disk is somewhat deviated, it is possible to accurately detect the frontage width of the inserted disk as the distance between the contact members on both sides.

In the case of such contact switches, when the disk is inserted into the slot by a predetermined depth, the contact members are pushed open by the peripheral edge of the disk to a predetermined frontage width causing the carrying motor to start.

Part of the switches are installed at positions where they are turned ON/OFF when the predetermined frontage width causing the carrying motor to start is exceeded; through this turning ON/OFF of the switches, the carrying motor is started as a result of the insertion of the disk.

The guide rail is installed with a sufficient width so as to extend to the slot ends, and the contact member moves along the guide rail together with the moving member, opening by a width larger than the diameter of the disk being carried, whereby passage of the disk is not hindered.

Parts of the switches are set so as to be turned ON/OFF when the maximum width (i.e., diameter) of the passing disk is approximately 12 cm and when the maximum width is approximately 8 cm, whereby it is also possible to detect the size of the disk inserted.

[PATENT DOCUMENT 1] JP-A-2002-329359 (paragraphs 0003 and 0004, FIGS. 5 through 7)

[PATENT DOCUMENT 2] JP-A-2003-77198 (paragraphs 0014 and 0015, FIGS. 5 and 6)

DISCLOSURE OF THE INVENTION

Problems to be Solved by the Invention

In the above-described rib-like guide member, its height should not be large from the viewpoint of a reduction in the thickness of the disk player. The maximum height of both end portions thereof is restricted, for example, to approximately 1.5 mm or less. If, under this restriction, the length of the guide member is set to be half of the diameter of the disk, the height of the guide member is 1.5 mm while the length thereof is 60 mm, which means the guide member is almost flat, and a sufficient inclination of the guide member cannot be attained.

When it is thus impossible to attain a sufficient inclination of the rib-like guide member, a desired inclination cannot be easily maintained if there is deformation of the casing of the disk player, etc., and it is rather difficult to retain the peripheral edge of the disk, causing an adverse influence on the disk surface, such as friction.

It is an object of the present invention to provide a disk carrying mechanism and a disk player which make it possible to secure a sufficient inclination of the rib-like guide member.

Means for Solving the Problems

According to an aspect of the present invention, a disk carrying mechanism includes: a roller which carries a disk along a carrying route by coming into contact with a front surface or a back surface of the disk inserted from an outside; and disk guide blocks installed so that the disk guide blocks are movable in a direction crossing the carrying route. In the disk carrying mechanism, the disk guide blocks have guide members which are arranged to oppose to the roller with the carrying route therebetween. The disk guide blocks come into contact with the disk being carried along the carrying route to maintain the disk in the carrying route. The guide members are formed as ridges extending in a direction crossing the carrying route and inclined so that the ridges are increased in height from a central portion toward side portions of the carrying route.

According to another aspect of the present invention, a disk player includes the above-described disk carrying mechanism of the present invention.

EXPLANATION OF CODES

Figure 1:
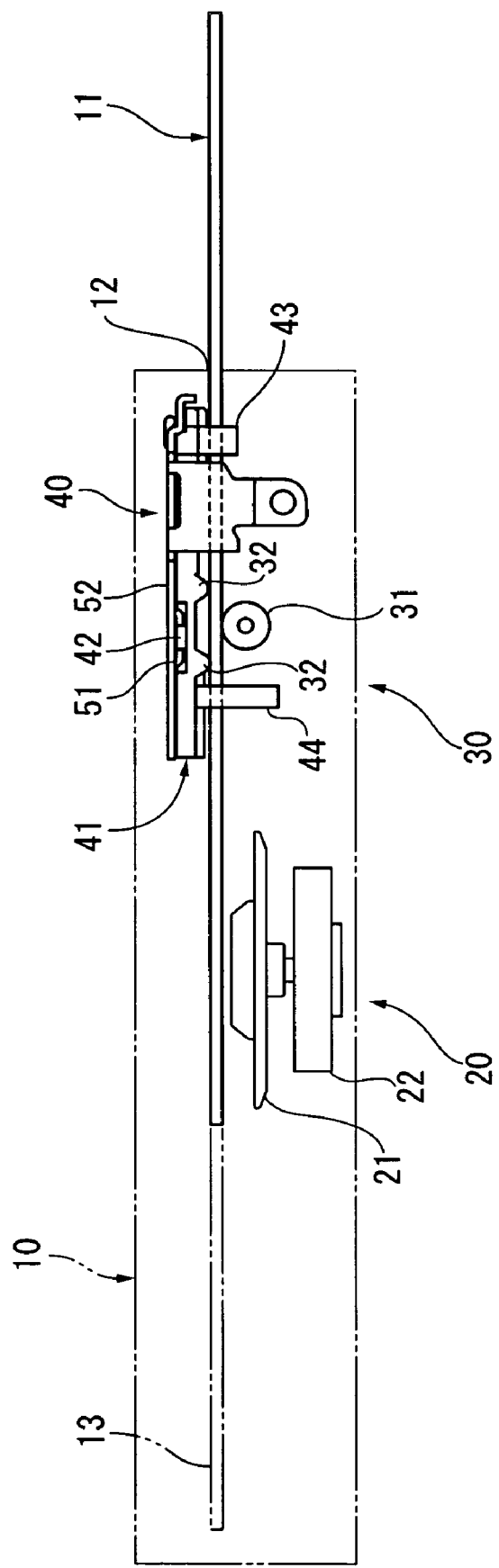
FIG. 1 is a partially omitted side view of a disk player according to an embodiment of the present invention.

10: disk player
11: disk
12: slot
13: rotating position
20: rotation drive mechanism
21: hub
22: motor
30: carrying mechanism (disc carrying mechanism)
31: roller
32: guide members
40: detection mechanism
41: disk guide block
42: support portion
43: front side abutment member
44: rear side abutment member
51: guide rail
52: base member
53 to 55: switch

BEST MODE FOR CARRYING OUT THE INVENTION

In the following, an embodiment of the present invention will be described with reference to the drawings.

Figure 2:
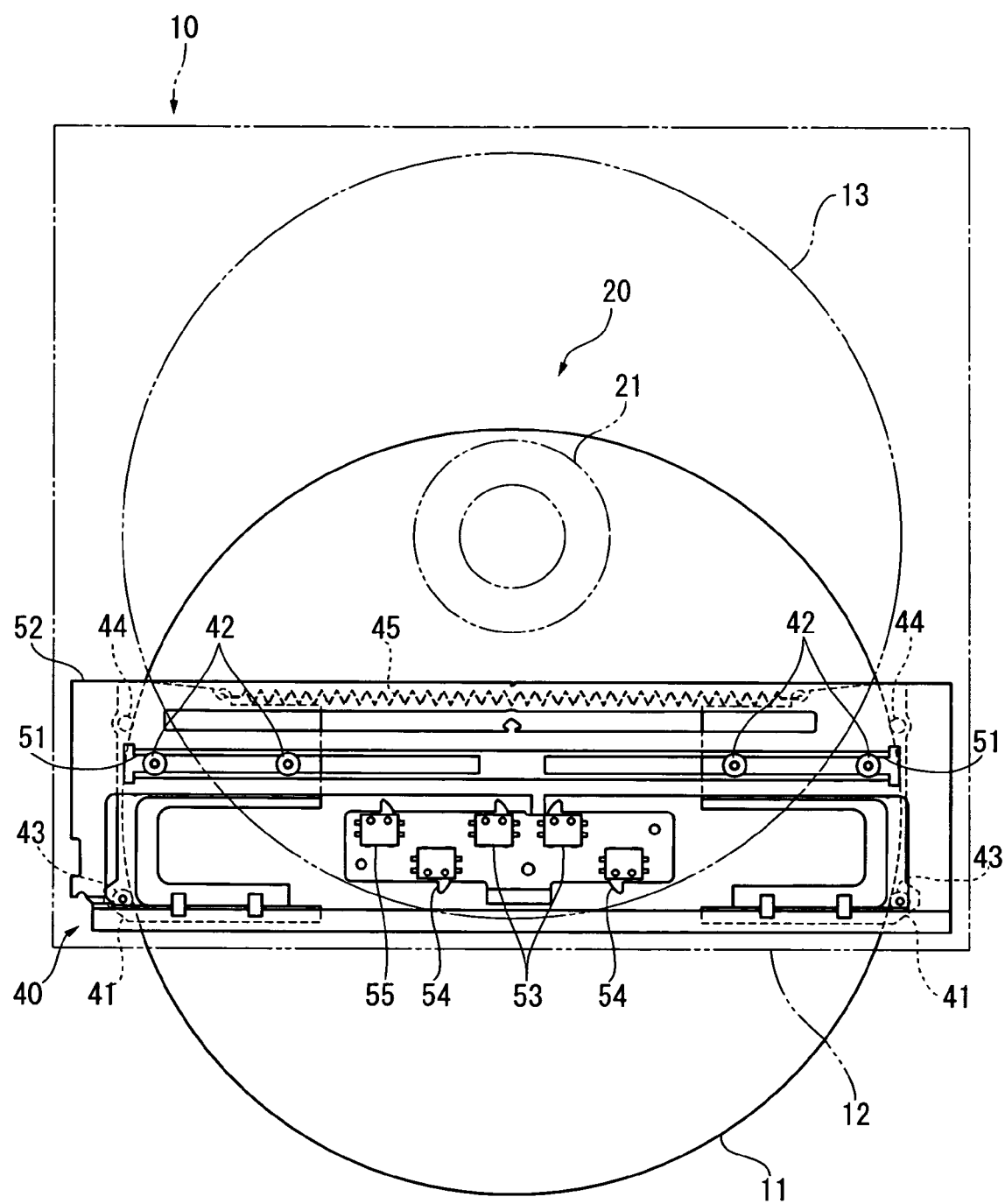
FIG. 2 is a partially omitted plan view of the disk player of the aforesaid embodiment.

Referring to FIGS. 1 and 2, this embodiment relates to a slot-in type disk player 10 for performing recording and reproduction on and from CDs and DVDs.

The disk player 10 has a casing of an ordinary rectangular-parallelepiped-shaped configuration, in the front surface of which there is formed a slot 12 for inserting a disk 11 from the outside.

Inside the disk player 10, there are installed a rotation drive mechanism 20 for rotating the disk 11, a carrying mechanism 30 for carrying the disk 11, a detection mechanism 40 for detecting the insertion of the disk 11, and a recording/reproduction mechanism (not shown) for performing recording and reproduction of data on and from the disk 11.

The carrying mechanism 30 serves to convey the disk 11, inserted through the slot 12, along a predetermined carrying route. Here, the carrying route is an imaginary route extending from the slot 12 to a rotating position 13 indicated by a chain double-dashed line in the drawing.

The carrying mechanism 30 is equipped with a thin and narrow cylindrical roller 31 arranged along the slot 12, and a motor (not shown) for rotating the roller 31. Further, the roller 31 is pressed against the disk 11 inserted by an urging means (not shown), and is rotated by the above-described motor.

The peripheral surface of the roller 31 is formed of a material having viscoelasticity, such as synthetic rubber, and is adapted to roll on a part of the back surface of the disk 11 to make it possible to carry the same.

The roller 31 is formed to be long enough to substantially extend over the entire width of the slot 12. Regarding the peripheral surface configuration of the roller 31, it is a tapered conical configuration whose both end portions are relatively thick and whose central portion is relatively thin, thus gradually increasing in thickness from the center toward both ends (see FIG. 3).

Thus, the roller 31 rolls on the back side of the disk 11 inserted through the slot 12, and can carry the disk 11 along the carrying route. In this process, due to the above-described peripheral surface configuration, the roller 31 can roll solely on the peripheral edge of the back surface of the disk 1, not on an inner portion (recording surface) of the peripheral edge of the back surface thereof.

In order to enable the roller 31 to reliably roll on the disk 11 inserted through the slot 12, the carrying mechanism 30 is equipped with guide members 32, which are situated on the opposite side of the roller 31 with respect to the carrying route (that is, the disk 11).

The guide members 32 are held in slide contact with the front surface of the disk 11, supporting the disk 11 that is pressed by the roller 31 from the other side; the guide members 32 also serve as the conventional guide member. In this embodiment, the guide members 32 are formed on a disk guide block 41 constituting a part of the detection mechanism 40, which will be described in detail below.

The rotation drive mechanism 20 supports and rotates the disk 11 carried to the rotating position 13, and is equipped with a hub 21 clamping the central hole portion of the disk 11, and a motor 22 for rotating the hub 21.

The hub 21 has a tapered conical configuration that allows insertion through the central hole of the disk 11; automatic centering is possible even if the disk 11 carried from the carrying mechanism 30 is somewhat deviated from the rotating position 13.

The detection mechanism 40 detects the insertion of the disk 11, and distinguishes the size of the disk 11 (e.g., whether its diameter is 12 cm or 8 cm). These detection results are utilized for motor control of the rotation drive mechanism 20 and the carrying mechanism 30, pick-up control of the recording/reproduction mechanism (not shown), etc.

The detection mechanism 40 is equipped with a pair of guide rails 51 respectively arranged on the right and left sides with respect to the carrying direction, and a pair of right and left disk guide blocks 41 movable along the guide rails 51. It should be noted that the disk guide blocks 41 are disk guide blocks for a slot-in type disk player according to the present invention.

The guide rails 51 are formed by notching a base member 52 formed of a metal plate material (see FIG. 2), and are arranged substantially parallel with the slot 12 (the width direction of the carrying route) together with the roller 31.

The base member 52 extends along the upper surface side of the carrying route from the vicinity of the slot 12 to a position on the depth side of the roller 31 (see FIG. 1).

Figure 3:
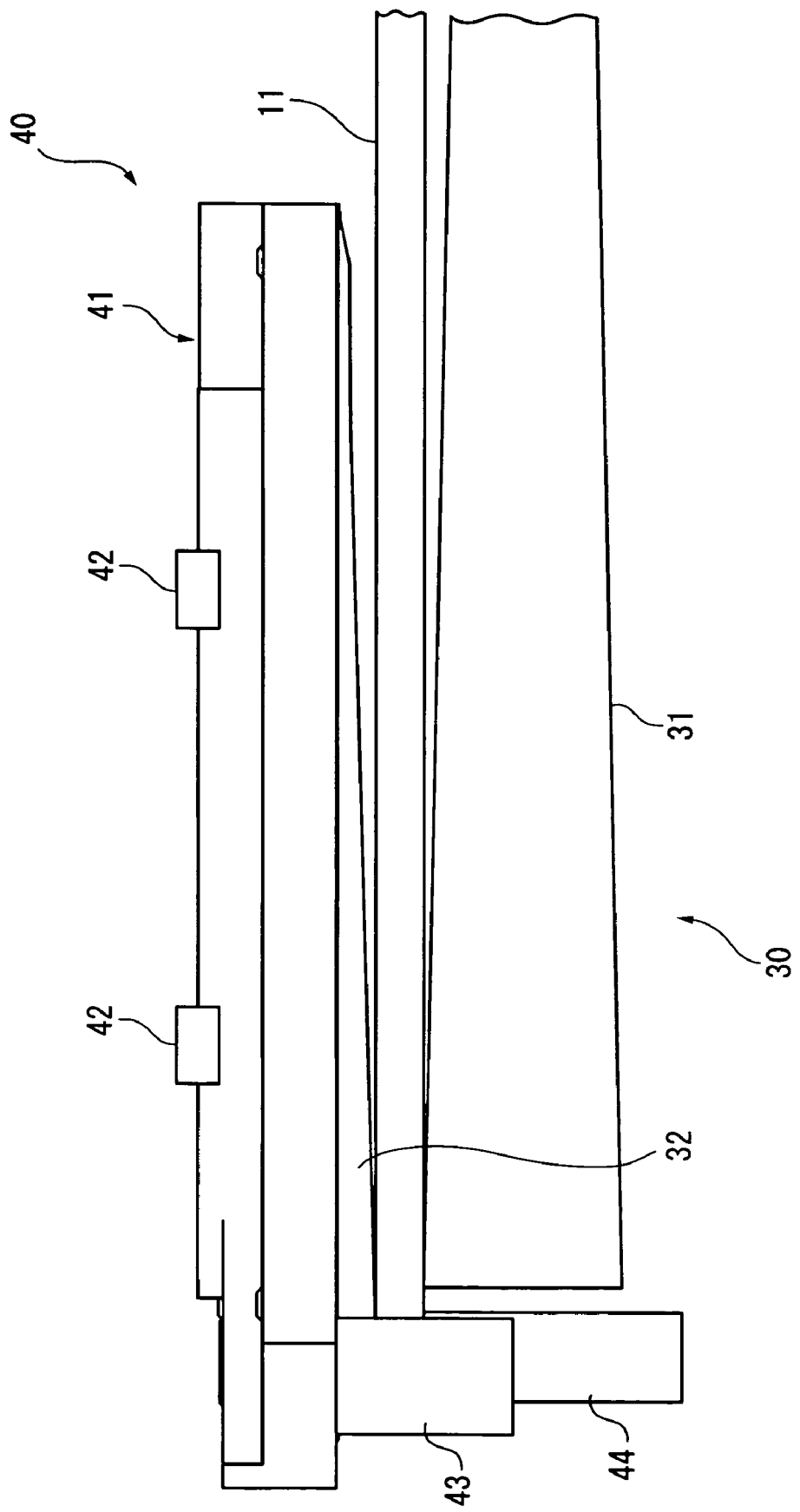
FIG. 3 is an enlarged side view of a main portion of the aforesaid embodiment.
Figure 4:
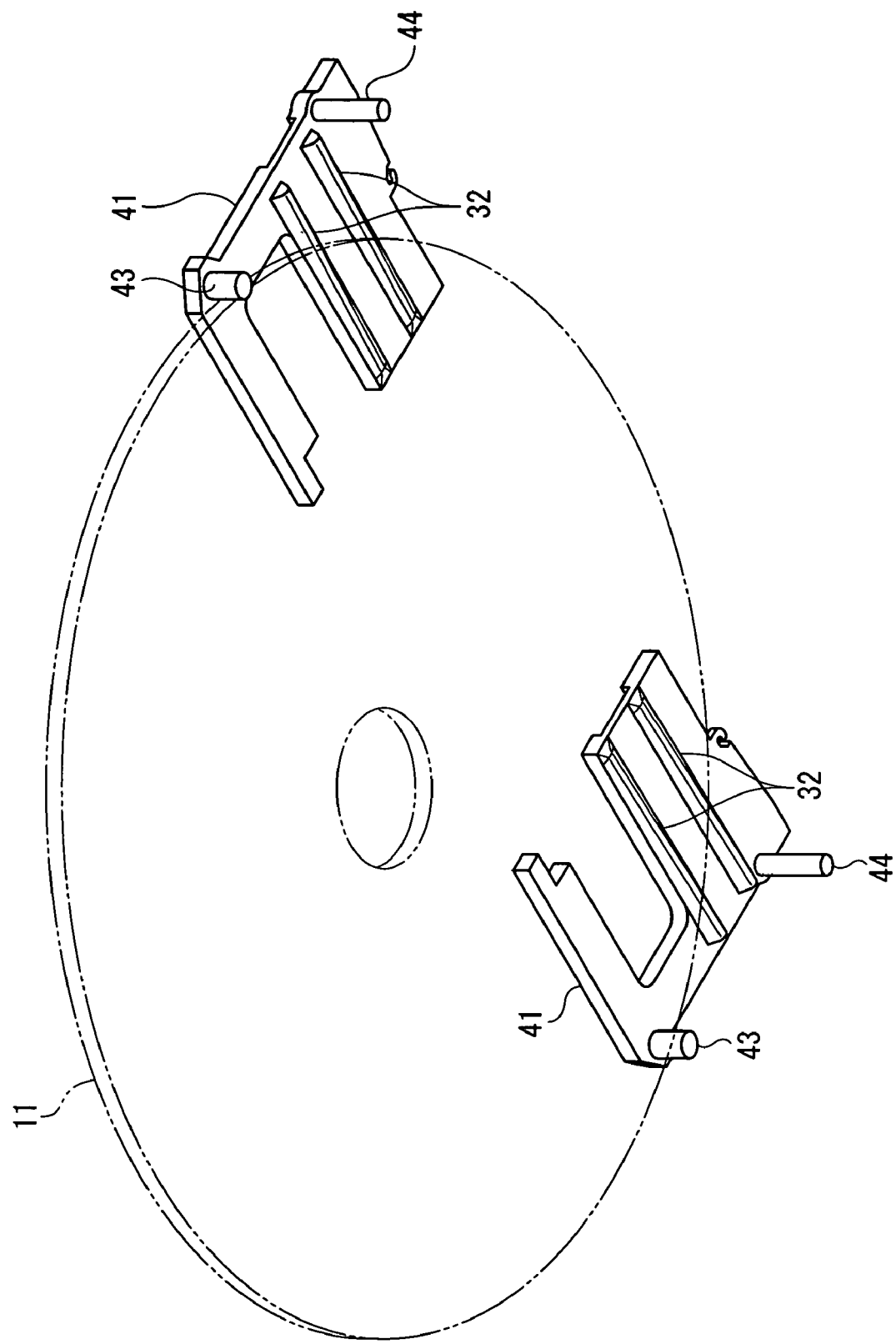
FIG. 4 is an enlarged plan view of a main portion of the aforesaid embodiment.

As also shown in FIGS. 3 and 4, the disk guide blocks 41 have a plurality of support portions 42 protruding from the upper surfaces thereof; the support portions 42 are inserted into and engaged with the slits of the guide rails 51, thereby the disk blocks 41 can smoothly slide along the guide rails 51.

The disk guide blocks 41 have a plurality of abutment members 43 and 44 at the end portions on the outer sides of the carrying route.

The front side abutment members 43 nearer to the slot 12 can be radially brought into contact with the peripheral edge of the disk 11 (see FIGS. 5 and 6), and are used to detect the insertion of the disk 11.

Figure 7:
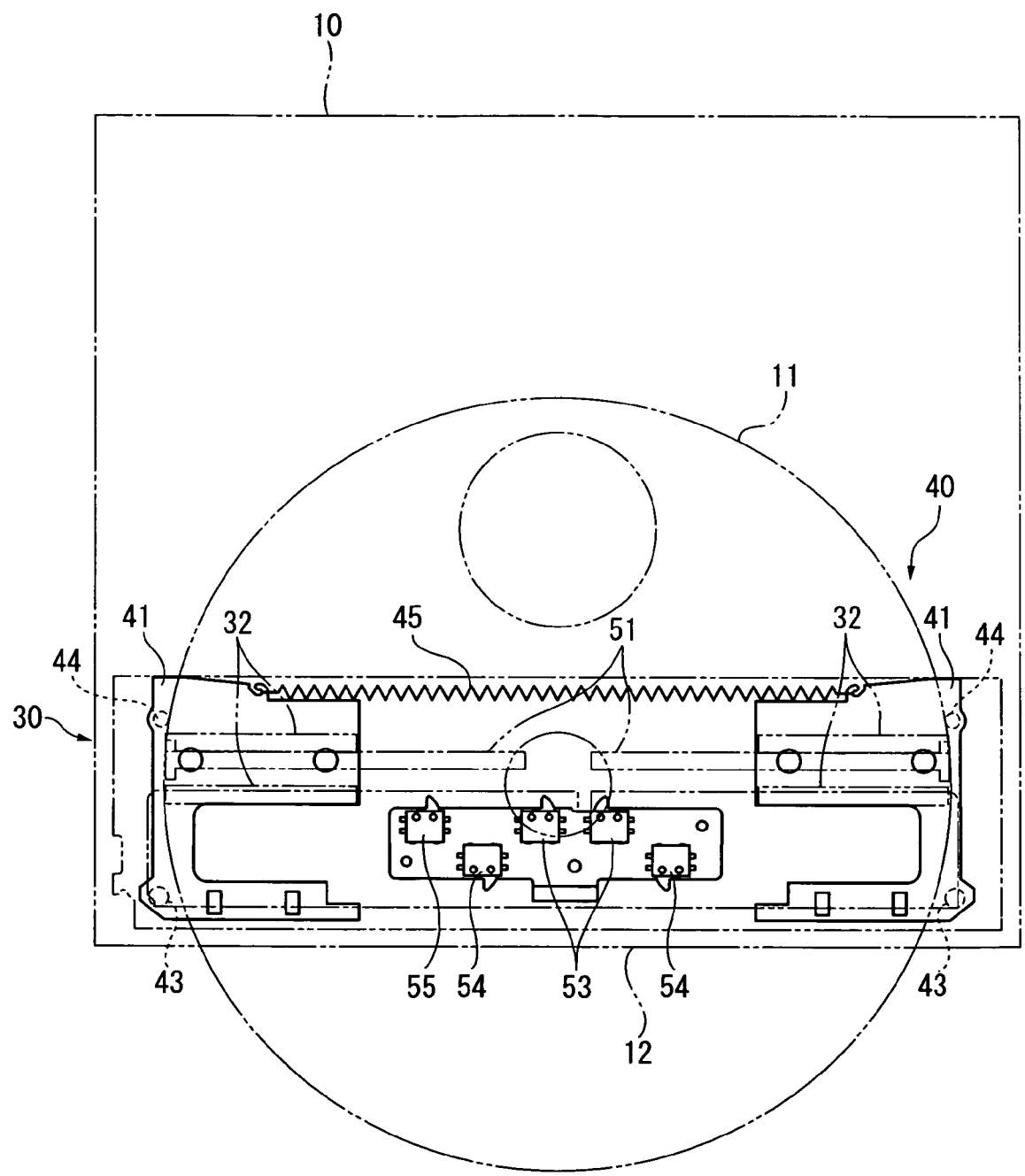
FIG. 7 is a partially omitted plan view showing how the disk is carried in the disk player of the aforesaid embodiment.
Figure 8:
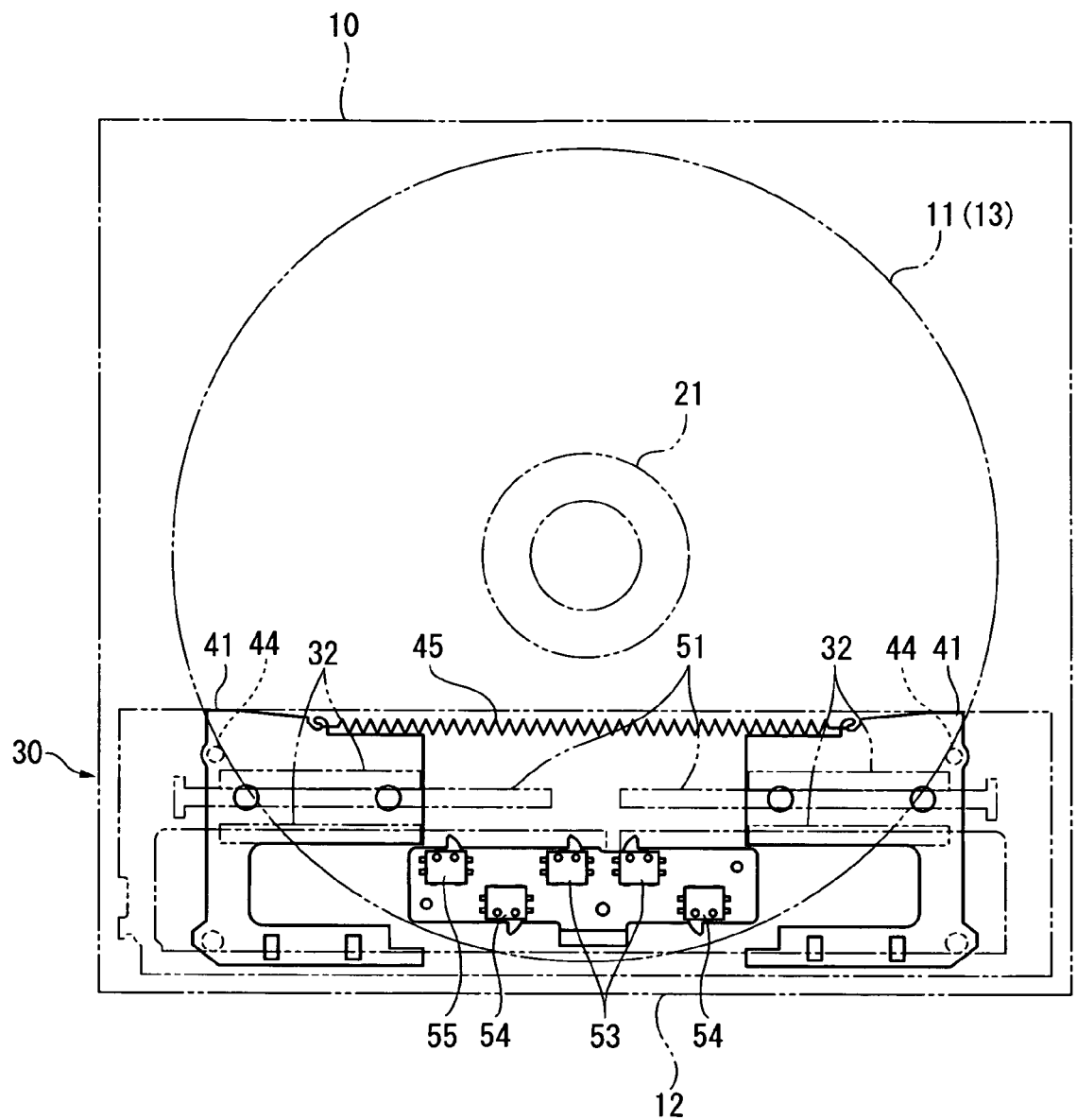
FIG. 8 is a partially omitted plan view showing how the disk is loaded into the disk player of the aforesaid embodiment.

The rear side abutment members 44 farther from the slot 12 can also be radially brought into contact with the peripheral edge of the disk 11; as the disk 11 is carried along the carrying route, the rear side abutment members 44 replace the front side abutment members 43 and come into slide contact with the disk 11 (see FIG. 7), making it possible to maintain the disk guide blocks 41 in the vicinity of the peripheral edge of the disk 11 (see FIG. 8).

The disk guide blocks 41 have on the lower surfaces thereof the above-described guide members 32 also serving as the guide members for the carrying mechanism 30.

The guide members 32 are ridges swollen downwardly from the lower surfaces of the disk guide blocks 41, with each disk guide block 41 having two guide members 32. The two guide members 32 of each disk guide block 41 are arranged with the roller 31 therebetween, with one being arranged on the slot 12 side and the other being arranged on the hub 21 side, thereby the disk 11 is reliably driven by the roller 31.

The cross sections of the guide members 32 taken in the width direction (i.e., the carrying direction of the disk 11) are of a substantially triangular, chevron-shaped configuration; in their longitudinal direction, the guide members 32 are higher on the outer sides of the carrying route than on the inner side thereof, that is, the guide members 32 are inclined from the outer sides toward the inner side (see FIG. 4).

Thus, when the roller 31 is pressed against the disk 11, the guide members 32 come into contact solely with the portions of the disk 11 in the vicinity of the peripheral edge thereof (see FIG. 3).

The portions from the support portions 42 to the guide members 32 are integrally molded of synthetic resin together with the main body portions of the disk guide blocks 41.

The above-described disk guide blocks 41 are arranged in a pair movable along the guide rails 51, and are urged toward each other by a coil spring 45.

Figure 5:
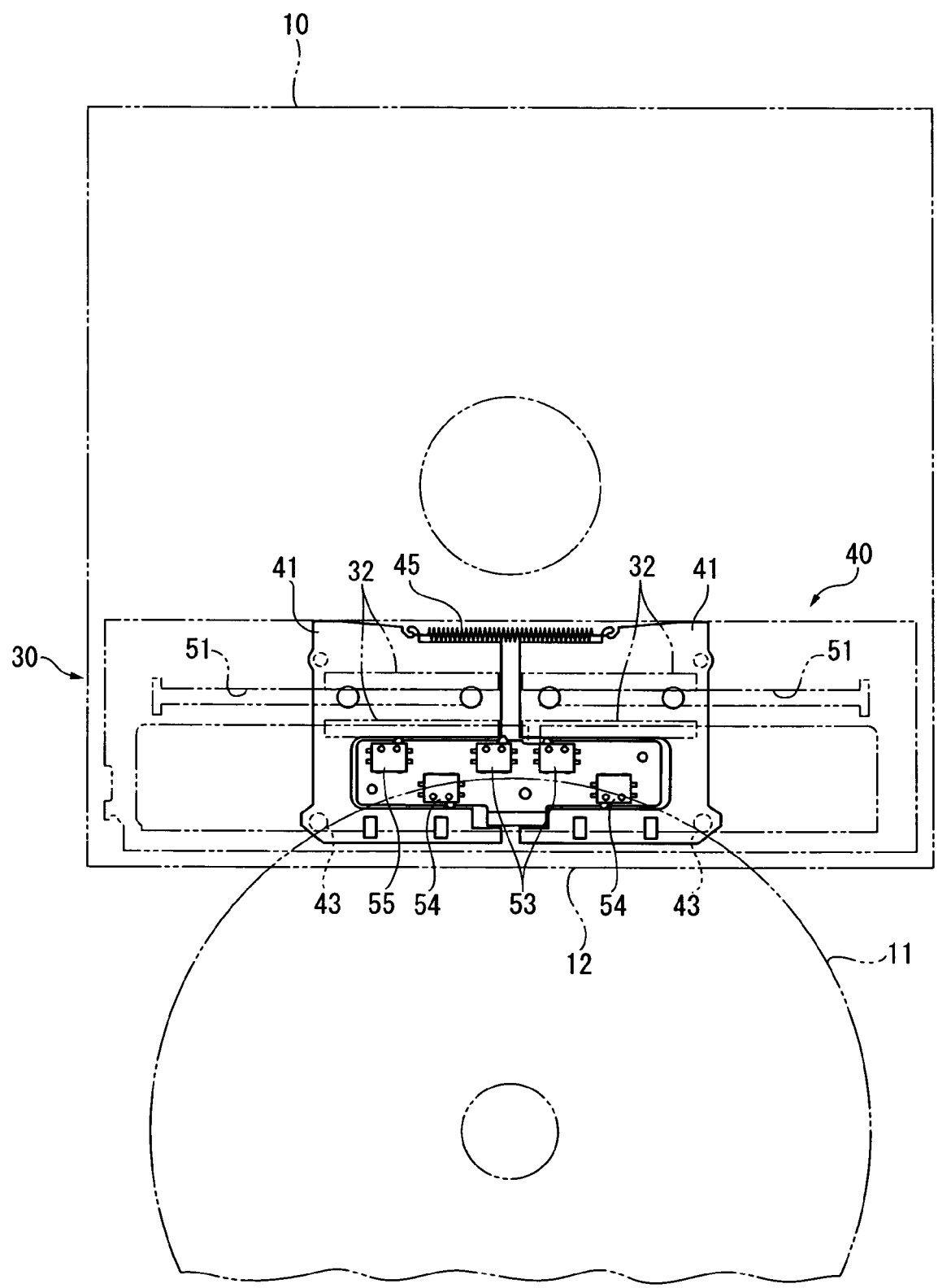
FIG. 5 is a partially omitted plan view showing how a disk is inserted into the disk player of the aforesaid embodiment.
Figure 6:
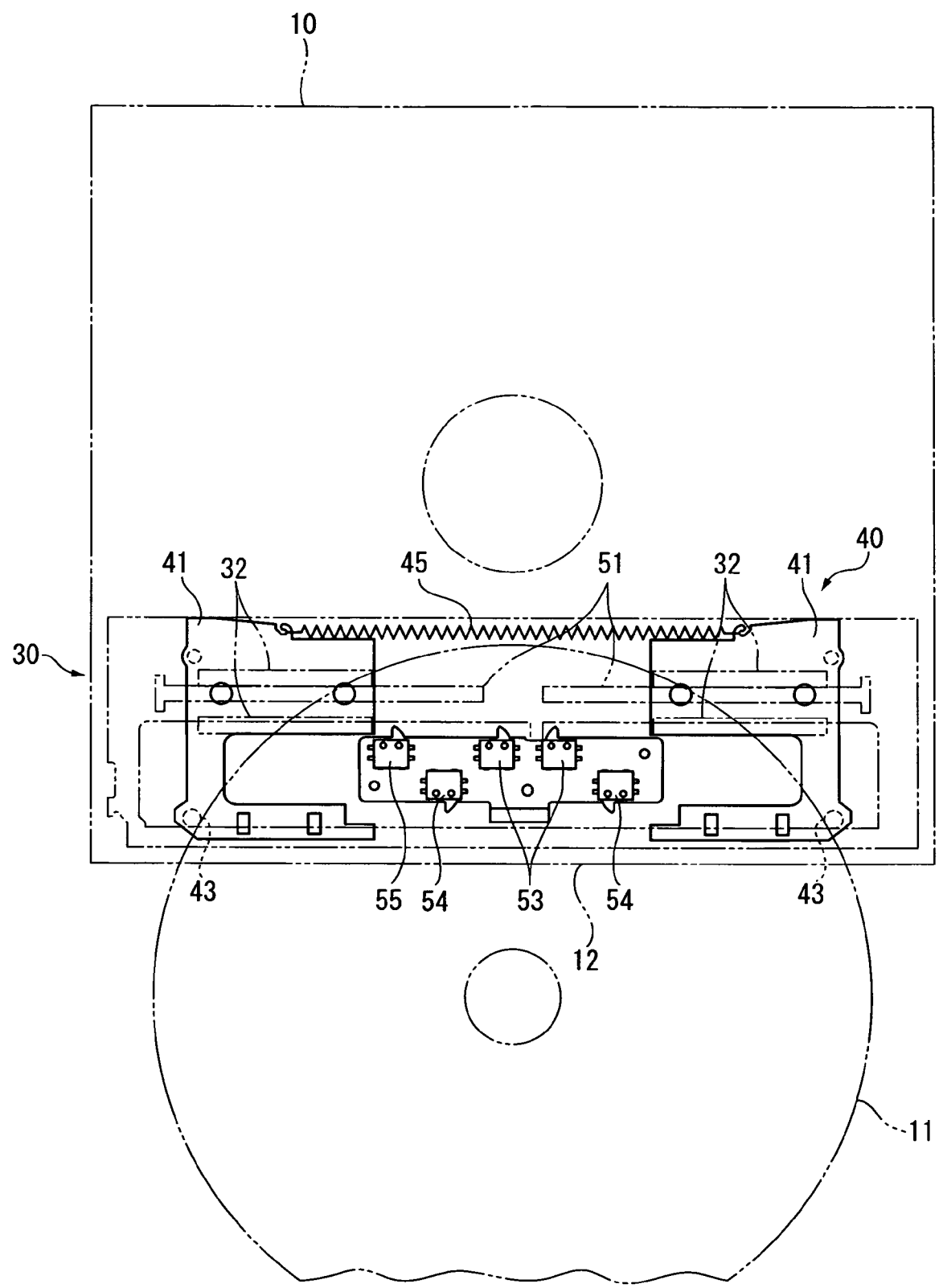
FIG. 6 is a partially omitted plan view showing how the disk is carried in the disk player of the aforesaid embodiment.

Due to this construction, the pair of disk guide blocks 41 are normally close to each other (see FIG. 5), and the front side abutment members 43 are pushed apart as the disk 11 is inserted, causing the disk guide blocks 41 to move away from each other (see FIG. 6). In this separated state, it is possible to detect the insertion of the disk 11 or the size of the disk 11.

To detect the separated state of the disk guide blocks 41 described above, a plurality of switches 53 through 55 are installed on the base member 52, and the condition of the switches is judged by a control circuit or the like (not shown), making it possible to detect the insertion of the disk 11 and the size of the disk 11 inserted.

The switches 53 are installed in a pair in the vicinity of the center of the carrying route or the slot 12.

In the state in which the disk guide blocks 41 are closest to each other in the central portion of the carrying route, the switches 53 are pushed by a part of the disk guide blocks 41 to be kept ON; they are turned OFF when the disk 11 is inserted and the disk guide blocks 41 are pushed by the disk 11 to be separated from each other to be released from the closest state.

When the pair of disk guide blocks 41 are offset to the right or to the left in the state in which they are closest to each other, one of the pair of switches 53 is turned OFF while the other remains ON, and the insertion of the disk 11 is not detected as long as both of them are turned ON. As a result, it is possible to reliably detect the insertion of the disk 11.

The switches 54 are arranged in a pair in the carrying route on the outer sides of the switches 53.

In the above-described state in which the disk guide blocks are closest to each other, the switches 54 are pushed by the part of the disk guide blocks 41 and are turned ON; when the inserted disk 11 has a diameter of 8 cm, they are OFF when the disk guide blocks 41 are most spaced apart from each other (that is, in a state in which the front side abutment members 43 are spaced apart from each other by the diameter of the 8 cm disk).

The switch 55, which is one in number, is arranged on the outer side of one of the switches 54.

In the above-described state in which the disk guide blocks 41 are closest to each other, the switch 55 is pushed by the part of the disk guide blocks 41 and is turned ON; when the inserted disk 11 has a diameter of 12 cm, the disk guide blocks 41 move to thereby turn OFF the switch 55.

When an 8 cm disk is inserted, the pair of disk guide blocks 41 is separated from each other through the insertion of the disk 11, and at least one of the pair of switches 54 is temporarily turned OFF. This switch 54 is turned ON again when the disk 11 passes. All that while, the disk guide blocks 41 are not spaced apart from each other beyond the diameter of the 8 cm disk, so that the switch 55 remains ON. In this state of the switches, the diameter of the disk 11 is detected to be 8 cm.

When a disk having a diameter of 12 cm is inserted, the pair of disk guide blocks 41 is spaced apart from each other through the insertion of the disk 11, and the pair of switches 54 are turned OFF. Further, the switch 55 is turned OFF. That is, all the switches 53, 54, and 55 are turned OFF. When the switches are in this state, the diameter of the disk 11 is detected to be 12 cm.

Due to the above construction, the detection mechanism 40 can detect the insertion of the disk 11 and the size thereof.

In the state in which the disk 11 has been carried to the rotating position 13, and clamped by the rotation drive mechanism 20, the pair of disk guide blocks 41 of the detection mechanism 40 are maintained at positions most spaced apart from each other by a mechanism (not shown) so that the rear side abutment members 44 may move away from the disk 11.

In view of this, it is desirable, for example, to provide a lock mechanism using a solenoid or the like as appropriate.

In this embodiment constructed as described above, the operation is conducted as follows.

In the state in which no disk 11 has been inserted into the disk player 10, the disk guide blocks 41 are closest to each other (see FIG. 5).

When the disk 11 is inserted into the slot 12, the pair of front side abutment members 43 is pushed apart by the peripheral edge of the disk 11, and the pair of disk guide blocks 41 moves respectively along the guide rails 51 to both sides of the carrying route (see FIG. 6).

In this state, the forward end of the disk 11 (that is, the front side thereof in the carrying direction; the upper side of FIG. 6) has reached the roller 31, and the carrying mechanism 30 is activated by the switches 53, whereby the carrying by the roller 31 is executed.

As the carrying goes on, the disk 11, which has been in the state in which the peripheral edge thereof is in contact with the front side abutment members 43, is brought into the state in which the disk 11 is in contact with the rear side abutment members 44 (see FIGS. 7 and 8). In this state, the rear side abutment members 44 are in contact with the peripheral edge of the disk 11, whereby the disk guide blocks 41 are maintained in the vicinity of the peripheral edge.

This embodiment, in which the operation is conducted as described above, provides the following effects. Since there are provided, as the carrying mechanism 30 for the disk 11, the roller 31 and the guide members 32 coming into contact with the disk 11 and maintaining it in the carrying route, it is possible to roll the roller 31 on the back side of the disk 11, making it possible to carry the disk 11 by the roller 31.

In particular, the guide members 32 are formed on the disk guide blocks 41 moving in the width direction of the carrying route along the peripheral edge of the disk 11, so that the guide members 32 move in conformity with the peripheral edge of the disk 11, making it possible to reliably effect contact at the peripheral edge portion of the disk.

In this connection, the guide members 32 are formed as ridges extending in a direction crossing the carrying route, and these ridges are inclined so as to be gradually increased in height from the center toward the side portions of the carrying route, and are brought into contact solely with the portions of the disk 11 in the vicinity of the periphery thereof, so that it is possible to avoid an adverse influence on the surface of the disk 11, such as wear.

Further, the guide members 32 are installed in a pair on the right and left sides and are movable in the width direction of the carrying route, so that, as compared with the conventional stationary guide members, it is possible to secure the same height while reduced in length, with the result that it is possible to make the inclination of the ridge portions in contact with the disk 11 steeper than in the prior art. Thus, the guide members come into contact solely with the portions of the disk 11 in the vicinity of the peripheral edge portion of the disk 11, thereby reliably preventing damage, etc. of the surface of the disk 11. Further, if, for example, the disk inserted is deviated to the right or left, the disk 11 is appropriately guided and is reliably carried to the predetermined carrying route.

The disk guide blocks 41 are provided with the front side abutment members 43 and the rear side abutment members 44 that are held in contact with the disk 11 to move in conformity with the peripheral edge thereof, so that if the relative positions of the disk guide blocks 41 with respect to the disk 11 change as the carrying goes on, the peripheral edge of the disk 11 is gradually shifted from the state in which it is in contact with the front side abutment members 43 to the state in which it is in contact with the rear side abutment members 44. Thus, the disk guide blocks 41 are always kept in the vicinity of the peripheral edge of the disk 11, making it possible to reliably attain the effect of guiding the disk 11 by the guide members 32.

The present invention is not restricted to the above-described embodiment; as long as they help to achieve the object of the present invention, various modifications, improvements, etc. are covered by the scope of the present invention.

For example, while in the above-described embodiment, the insertion of the disk 11 and the size of the disk 11 are detected by the switches 53 through 55, the arrangement of the switches 53 through 55 or the detection system may be changed as appropriate; instead of the contact type switches, it is also possible to use some other means, such as optical sensors. When the disk size is restricted to one, there is no need to perform size detection.

While in the above-described embodiment, the main body portions of the disk guide blocks 41 and the other portions thereof, from the support portions 42 to the guide members 32, are integrally molded of synthetic resin, it is also possible to form the various portions separately and fix them to the main body portion by adhesion, welding, or some other means. The material of the disk guide blocks 41 is not restricted to resin molding; it is also possible to form the disk guide blocks 41 of sheet metal stampings or the like.

While the disk guide blocks 41 are provided with two kinds of protrusions, the front side abutment members 43 and the rear side abutment members 44, to thereby secure the following movement property with respect to the vicinity of the peripheral edge of the disk 11, it is also possible to cause three or more protrusions to successively come into contact with the disk 11. When the dimension of each of the disk guide blocks 41 in the disk carrying direction can be made small, the number of protrusions may be one.

The number of rows of guide members 32 provided on each disk guide block 41 is not restricted to two; it is also possible to form them in three or more rows or in one row. Also in the case where the guide members 32 are provided in two rows, it is not indispensable for the guide members 32 to be provided on both sides of the roller 31. However, by arranging the guide members 32 as in the above-described embodiment, it is possible to maintain a proper pressure of the roller 31 with respect to the disk 11 and to optimize the drive for carrying.

While in the above-described embodiment, the roller 31 is provided on the back surface side of the disk 11 and the guide members 32 are provided on the front surface side of the disk 11, this positional relationship may be reversed.

Apart from this, regarding the specific constructions and structural details of the rotation drive mechanism 20, the carrying mechanism 30, and the detection mechanism 40, it is possible to utilize existing constructions as appropriate; in utilizing them, such existing constructions allow modifications as appropriate.

EFFECT OF THE EMBODIMENT

As described above, in this embodiment, the guide members 32 are used as the rib-like guide members, and the length of the guide members 32 is reduced, whereby their inclination can be made steeper, and the peripheral edge of the disk can be retained reliably, thereby preventing problems such as damage of the disk surface.

INDUSTRIAL APPLICABILITY

The present invention is applicable to a disk carrying mechanism and a disk player in which a disk-like recording medium is loaded in and out, and can be applied to a computer system using a disk-like recording medium and to a video/audio recording/reproducing apparatus.

The invention claimed is:

1. A disk carrying mechanism, comprising:
 a roller which carries a disk along a carrying route by coming into contact with a front surface or a back surface of the disk inserted from an outside; and
 disk guide blocks installed so that the disk guide blocks are movable in a direction crossing the carrying route, wherein
 the disk guide blocks have guide members which are arranged to oppose to the roller with the carrying route therebetween, and which come into contact with the disk being carried along the carrying route to maintain the disk in the carrying route, and
 the guide members are formed as ridges extending in a direction crossing the carrying route and inclined so that the ridges are increased in height from a central portion toward side portions of the carrying route.

2. The disk carrying mechanism according to claim 1, wherein
 the disk guide blocks are arranged in a pair respectively on right-hand and left-hand sides with respect to a carrying direction, and
 the respective guide members of the disk guide blocks are inclined in opposite directions and arranged substantially symmetrically.

3. The disk carrying mechanism according to claim 1 wherein the disk guide blocks have abutment members that radially come into contact with a peripheral edge of the disk inserted from the outside.

4. The disk carrying mechanism according to claim 3, wherein a plurality of the abutment members are arranged, two of which are arranged to oppose to each other with the roller therebetween.

5. A disk player, comprising:
 a disk carrying mechanism including: a roller which carries a disk along a carrying route by coming into contact with a front surface or a back surface of the disk inserted from an outside: and disk guide blocks installed so that the disk guide blocks are movable in a direction crossing the carrying route, wherein
 the disk guide blocks have guide members which are arranged to oppose to the roller with the carrying route therebetween, and which come into contact with the disk being carried along the carrying route to maintain the disk in the carrying route, and
 the guide members are formed as ridges extending in a direction crossing the carrying route and inclined so that the ridges are increased in height from a central portion toward side portions of the carrying route.

6. The disk player according to claim 5, wherein
 the disk guide blocks are arranged in a pair respectively on right-hand and left-hand sides with respect to a carrying direction, and
 the respective guide members of the disk guide blocks are inclined in opposite directions and arranged substantially symmetrically.

7. The disk player according to claim 5, wherein the disk guide blocks have abutment members that radially come into contact with a peripheral edge of the disk inserted from the outside.

8. The disk player according to claim 7, wherein a plurality of the abutment members are arranged, two of which are arranged to oppose to each other with the roller therebetween.

* * * * *